M. TRITSCH.
SPECTACLE RIM STRETCHING DEVICE.
APPLICATION FILED OCT. 26, 1918.
1,300,520.
Patented Apr. 15, 1919.
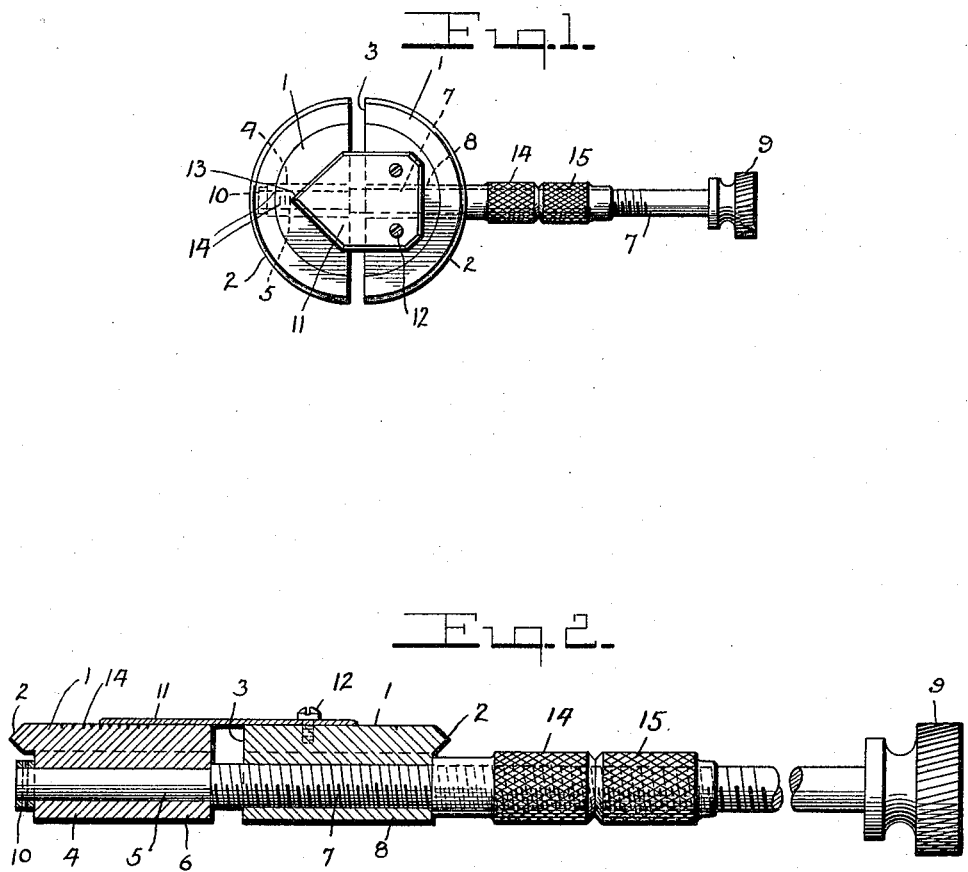
Witnesses
RN Jones
Inventor
M Tritsch
By Victor J. Evans
Attorney

UNITED STATES PATENT OFFICE.

MIKE TRITSCH, OF PLATTSMOUTH, NEBRASKA.

SPECTACLE-RIM-STRETCHING DEVICE.

1,300,520.  Specification of Letters Patent.  Patented Apr. 15, 1919.

Application filed October 26, 1918. Serial No. 259,830.

*To all whom it may concern:*

Be it known that I, MIKE TRITSCH, a citizen of the United States, residing at Plattsmouth, in the county of Cass and State of Nebraska, have invented new and useful Improvements in Spectacle-Rim-Stretching Devices, of which the following is a specification.

This invention relates to a spectacle rim stretcher, the broad object of the invention being to provide a simple and effective device adapted to stretch the rims of spectacles in order to enlarge the same sufficiently to receive the glass or lens, the device being of simple construction and being portable.

With the above and other objects in view, the invention consists in the construction, combination and arrangement of parts, as herein described, illustrated and claimed.

In the accompanying drawing:—

Figure 1 is a plan view of the rim stretching device, and Fig. 2 is a longitudinal section through the same taken in line with the jaw-expanding member.

The rim stretching device, in the preferred embodiment thereof, comprises two rim stretching jaws 1. Each of the jaws 1 is preferably of semi-circular or semi-disk formation embodying an outer semi-circular spectacle engaging face or edge 2 and a straight diametrical edge 3, the edges 3 of the jaws being adapted to meet throughout their length. One of the jaws 1 is formed on its under side with a sleeve 4 in which is freely rotatable the smooth reduced portion 5 of a jaw expanding member 6 shown in the form of a straight shank having a threaded portion 7, which engages an internally threaded sleeve or extension 8 on the under side of the other rim expanding jaw 1 as shown in Fig. 2. The jaw expanding member is provided at one end with a suitable operating handle 9 by the means of which it may be rotated. On its other end, the reduced shank of the jaw expanding member has a fixed collar or stop 10 which prevents a longitudinal movement of the jaw expanding member in relation to that jaw with which it has a freely rotatable connection.

In order to prevent relative turning movement of the two jaws, a gage strip or plate 11 is secured fixedly by fastening means 12 to one of the jaws, said plate overlapping the other jaw and being brought to an indicating point 13 which traverses graduations 14 on the jaw which it overlaps. This enables the operator to gradually gage the degree of movement of the jaws in relation to each other in accordance with the size of the glass or lens to be applied to the frame about to be expanded or stretched. The plate or gage piece is of sufficient width to prevent relative rotative movement of the jaws.

After ascertaining the diameter of the lens or glass by adjusting the stretching device, the device is then collapsed by moving the jaws toward each other sufficiently to enable them to be placed within the rim to be stretched. Then by means of the jaw expanding member, the jaws are forced away from each other, until the proper graduation is indicated by the gage piece. The jaws are then moved together by the jaw expanding device, the latter is removed from the spectacle rim and the glass or lens inserted in place.

The outer arcuate edges of the jaws are reversely beveled or chamfered as shown, so as to fit the lens receiving groove of the spectacle rim. This serves to hold the rim stretching the device in place in relation to the rim during the expanding operation.

14 designates the sleeve like stop which is threaded upon the threaded portion 7 of the shank of the expanding member and 15 designates the sleeve like lock nut which is adapted to bear against the adjacent end of the stop 14 to prevent movement of the latter. When said stop comes in contact with the extension 8 above described it prevents any further opening or expanding movement of the jaws. This enables the jaws to be moved toward each other preparatory to inserting the device in the rim of an eye glass and also serves to regulate the expanding movement of the jaws whereby accurate work may be performed.

I claim:—

1. A device for expanding spectacle rims, comprising a pair of rim-expanding jaws, each having an arcuate outer edge, a jaw-expanding member having a freely rotatable engagement with one of said jaws and a threaded engagement with the other jaw, said jaw-expanding member extending beyond both jaws and having a suitable operating handle by means of which said jaw-expanding member may be rotated, and a plate fastened to one of said jaws and overlapping the other jaw, said plate serving to prevent relative rotative movement of the jaws.

2. A device for expanding spectacle rims, comprising a pair of rim-expanding jaws, each having an arcuate outer edge, a jaw-expanding member having a freely rotatable engagement with one of said jaws and a threaded engagement with the other jaw, said jaw-expanding member extending beyond both jaws and having a suitable operating handle by means of which said jaw-expanding member may be rotated, and a gage plate fastened to one of said jaws and overlapping the other jaw, said plate serving to prevent relative rotative movement of the jaws.

3. A device for expanding spectacle rims, comprising a pair of rim-expanding jaws, each having an arcuate outer edge, a jaw-expanding member having a freely rotatable engagement with one of said jaws and a threaded engagement with the other jaw, said jaw-expanding member extending beyond both jaws and having a suitable operating handle by means of which said jaw-expanding member may be rotated, the arcuate edges of said jaws being beveled.

4. A device for expanding spectacle rims, comprising a pair of rim-expanding jaws, each having an arcuate outer edge, and a jaw-expanding member having a freely rotatable engagement with one of said jaws and a threaded engagement with the other jaw, said jaw-expanding member extending beyond both jaws and having a suitable operating handle by means of which said jaw-expanding member may be rotated, and stop means for limiting the expanding movement of the jaws.

In testimony whereof I affix my signature.

MIKE TRITSCH.

Copies of this patent may be obtained for five cents each, by addressing the "Commissioner of Patents, Washington, D. C."